(12) United States Patent
Hutchison et al.

(10) Patent No.: US 7,674,992 B2
(45) Date of Patent: Mar. 9, 2010

(54) KEY FOR A MOBILE DEVICE

(75) Inventors: Mark Hutchison, Hampshire (GB);
Caroline Millar, Bramley (GB)

(73) Assignee: Vertu Limited, London (GB)

( * ) Notice: Subject to any disclaimer, the term of this patent is extended or adjusted under 35 U.S.C. 154(b) by 1744 days.

(21) Appl. No.: 10/814,694

(22) Filed: Mar. 30, 2004

(65) Prior Publication Data
US 2004/0214618 A1 Oct. 28, 2004

(30) Foreign Application Priority Data
Apr. 1, 2003 (GB) ................... 0307520.7
Apr. 2, 2003 (GB) ................... 0307611.4

(51) Int. Cl.
*H01H 9/00* (2006.01)

(52) U.S. Cl. ...................... 200/314; 200/313

(58) Field of Classification Search .......... 200/310–317
See application file for complete search history.

(56) References Cited

U.S. PATENT DOCUMENTS
4,370,532 A * 1/1983 Green ..................... 200/314
(Continued)

FOREIGN PATENT DOCUMENTS
DE 100 11 800 A1 9/2001
(Continued)

OTHER PUBLICATIONS
Patent Abstract of Japan, Yasuhiko, Y. et al., "Formation of Fin and Rugged Surface of Welded Heat Transfer Pipe", Publication No. 03013202 A, Jan. 22, 1991.
(Continued)

*Primary Examiner*—Kyung Lee
(74) *Attorney, Agent, or Firm*—Harrington & Smith

(57) ABSTRACT

A mobile device operable with keys 14 having characters 16 engraved onto the surface of the keys. To provide back illumination, visual traces of the characters are provided by a plurality of holes 18 made to the keys to provide spot light outlets adapted to collectively define the traces. The holes can be drilled and the key caps can be made of steel or other metals. The grooves 16 can be closed by a translucent material such as resin to block the ingress of dirt into the holes 18.

21 Claims, 6 Drawing Sheets

U.S. PATENT DOCUMENTS

| | | | | |
|---|---|---|---|---|
| 4,997,998 A * | 3/1991 | Bauer | | 200/345 |
| 5,266,949 A * | 11/1993 | Rossi | | 341/22 |
| 5,408,060 A | 4/1995 | Muurinen | | 200/314 |
| 6,467,924 B2 * | 10/2002 | Shipman | | 362/600 |
| 6,498,311 B1 * | 12/2002 | Stewart et al. | | 200/313 |
| 6,558,013 B2 * | 5/2003 | Tholin et al. | | 362/29 |
| 2001/0022722 A1 | 9/2001 | Shipman | | 362/31 |
| 2001/0032779 A1 | 10/2001 | Davidson et al. | | 200/341 |
| 2002/0101738 A1 | 8/2002 | Misaras | | 362/487 |

FOREIGN PATENT DOCUMENTS

| | | |
|---|---|---|
| EP | 1 139 363 A2 | 10/2001 |
| GB | 2 311 748 | 10/1997 |
| JP | 55-100255 | 7/1980 |
| JP | 62-10666 | 1/1987 |
| JP | 03-13202 | 1/1991 |
| JP | 04-13987 | 1/1992 |
| JP | 5-174657 | 7/1993 |
| JP | 6-15227 | 2/1994 |
| JP | 6-50192 | 7/1994 |
| JP | 07329111 A | 12/1995 |
| JP | 09-102240 | 4/1997 |
| JP | 2002232547 A | 8/2002 |
| JP | 2003-86045 | 3/2003 |
| WO | WO-02/15211 A1 | 2/2002 |

OTHER PUBLICATIONS

Patent Abstract of Japan, Noriaki, N. et al., "Approach Alarm Device", Publication No. 04013987 A, Jan. 17, 1992.

Patent Abstract of Japan, Yasuo, T. et al., "Both Sides Copying Device", Publication No. 62010666 A, Jan. 19, 1987.

Patent Abstract of Japan, Sadao, N. et al., "Two-Piece Cover Member For Pushbutton Switch", Publication No. 09102240 A, Apr. 15, 1997.

* cited by examiner

KEY FOR A MOBILE DEVICE

FIELD OF THE INVENTION

This invention relates to a key for a mobile communication device. The invention relates particularly, but not exclusively, to illuminated key caps for mobile communication devices.

BACKGROUND OF THE INVENTION

Various mobile devices have keys for receiving user input such as text, numbers or user commands. Such keys often contain a legend printed on a key cap, as in a wired or wireless telephone or Personal Digital Assistant (PDA) device. It is very common to illuminate such legends, particularly for mobile communication devices, by forming a key cap at least partly of a light conductive material and providing an illuminator behind the key cap so that an associated legend can be seen even without any ambient light. For instance, Nokia™ 6110 mobile telephone contained a key mat, which formed all the key caps to a telephone keypad. The key mat was made of a light conducting rubber or plastics and coated with black relatively opaque material that was then cut by a laser to form the necessary legends to the keys, hence forming white legends on black background. These legends contained the digits, alphabets and the asterisk and hatch signs. Nokia™ 5110 mobile telephone also had a light conducting key mat, but instead of carving to an opaque key surface, opaque material was deposited on the key surface to form the legends, hence providing black legends on a white background.

SUMMARY OF THE INVENTION

Common to both of these mobile phones, the legends are formed continuous as in ordinary writing. Either the legends or their background is illuminated so that the legends can be seen as an illuminated or non-illuminated surface.

According to a first aspect of the invention there is provided a key cap for a mobile device, providing a visual trace of a character perceivable under back illumination, wherein the key cap defines a plurality of holes to provide spot light outlets adapted to collectively define the trace.

Advantageously, the spot light outlets collectively define the trace such that the trace of the character may appear consistent. For instance, no special un-punctured regions need to be left to maintain the integrity of the key cap whilst the holes may be through holes.

The holes may define the trace by defining a light passing track along the trace. Alternatively, the holes may define the trace by defining a light passing area around the trace such which itself is less light passing than its surrounding area, defining an inverse illuminated trace of a character. The trace may be shown in dark as a bright track of light passing holes. Alternatively, the trace may be shown in dark as a dark track between light passing holes around the trace.

The key cap may consist of an opaque material such as a metal. The metal is advantageously a precious metal so as to produce a high-class metal appearance with a low skin irritation risk. Advantageously, it will be possible to produce a mobile device with all metal keys with illuminated legends but without necessarily a need to join different materials together. Such keys are inherently robust, easy to reuse and easy to recycle. The ease of reuse and recycling is particularly valuable when precious metals are used as materials for the key cap.

The holes may have a diameter over 0.02 mm. The diameter may be under 0.5 or 1 mm. Preferably, the diameter is 0.02 to 0.3 mm. The smaller the diameter, the more holes the key cap may define close to each other such that a high-quality appearance can be provided and the illuminating spots may appear to merge together. The diameter of a hole may be smaller than the thickness of the material surrounding the hole. Advantageously, a tubular shape of the holes provides a particular visual effect in which light seems to tunnel out of numerous relatively small holes rather than refract from a common illuminated surface.

Advantageously, no support layers are necessary to keep central parts or islands of looped characters such as "O" or "6" in place. The characters may be digits, alphabets or any other characters.

The key cap may further comprise a groove further defining the trace of the character such that the trace is visible in daylight. The groove may be aligned with at least a portion of the holes. Advantageously, the groove may define a continuous line that is easy to perceive when back illumination would not be visible.

Alternatively, the holes may comprise an enlarged mouth to facilitate recognition of the character in the daylight.

Alternatively, the holes may be blind holes and the key cap may be at least partly transparent in order to pass light through the holes so that the legend can be perceived in the dark. Advantageously, the trace of the character defined by the holes is not only visible under good illumination but also in dark when back illumination is applied via the holes. The key cap may be partly opaque so that the holes appear substantially brighter than their surrounding under back illumination.

The holes may be micropores or drilled holes, punched, etched, or cut. The cross-section of the holes may be substantially non-directional, particularly substantially circular.

The key cap may comprise a transparent dust seal to restrain the entry of dust to the interior of the key or the mobile device.

The key cap may further comprise a set of protruding points providing writing for the blind. The protruding points may have been formed by locally pulling the actuation layer or by pressing from the reverse side. Advantageously, a common layer of key cap material may provide a key cap for receiving user actuation, a visual legend and a tactile pattern for providing a blind recognisable legend.

Further, the visual and blind recognisable patterns may both be produced with a common act of pressing a sheet of key cap material between two template press members that have respectively aligned pins to form the holes and the protruding points.

The holes may be substantially unidirectional. Advantageously, the intensity of the light conveyed by different unidirectional holes is substantially similar in various angles relative to their common axis.

Alternatively, the key cap defines at least two substantially parallel rows or strings of holes so that they will convey light to different angles substantially consistently so that the different parts of a legend appear to have substantially the same brightness when the backlight illumination is used.

The key cap may define a plurality of substantially parallel rows of holes. Alternatively, the key cap defines a plurality of holes in a dithered alignment so as to provide an impression of smooth lines particularly at curves. The holes may define a mesh conforming to the shape of the character, particularly if the trace of the character is defined by illuminating the surroundings of the character more than the character itself.

The key cap may comprise further holes surrounding the character so as to indicate the key cap area by back light, particularly around the edges of the key cap.

The holes may be blocked with a transparent material such that a back light passing through the holes will refract diffusely so as to increase the angle of visibility of such light. The transparent material may have a non-uniform refractive index and/or a non-planar surface so as to provide the diffuse refraction.

The blocking of the holes for diffusing the passing light may be effected in common with the dust blocking. Light-passing materials such as transparent, translucent or pearlescent materials may be used in the blocking of the holes. The transparent material may be translucent resin. Alternatively, the transparent material may comprise at least partly transparent ink. The transparent material may also contain filler. The filler may comprise particles or pigments which increase the reflectivity. Hence, a better daylight appearance of the characters can be provided. The filler may comprise particles or pigments which change the colour or reflect and diffract the transmitted light in darkness. This may further enhance the visual effect provided and/or increase the angle of view over which the character is easy to perceive in the dark under back illumination.

The filler may comprise a light scattering increasing substance such as metal particles or mica particles. Hence, non-uniform reflection of light can further be employed to diffuse light that comes out through the holes. Further, the scattering may facilitate the perception of the characters in day light.

The filler may comprise fluorescent material. This will provide an impressive visual effect and also provide a period of visibility of the keys in the dark extending over the instant when the back light is switched off.

The ink or resin may have a paint type of composition which contains a liquid base and a solid filler. The composition may be introduced to block the holes and then harden based on a chemical reaction or by melting a substance and letting it cool to harden.

The holes may extend from the bottom of engraving and the transparent material may substantially fill the engraving to block the holes. The engraving may not only provide a daylight visual characters but it may also facilitate the blocking of the holes so the diameter of the hole can be smaller than that suitable for blocking with the transparent material. For instance, the viscosity of the transparent material in a fluid phase and the dimensions of the engraving and the holes may be set such that the transparent material can fill the engraving without flowing through the holes. This removes the inconsistence that otherwise could be caused by some holes filling only partly leaving different voids and uneven refraction of back light through different holes.

According to a second aspect of the invention there is provided a switch arrangement comprising an electrical switch and a key cap providing a visual trace of a character perceivable under back illumination, wherein the key cap defines a plurality of holes to provide spot light outlets adapted to collectively define the trace, and the key cap is moveable in relation to the switch so that the switch can be actuated with the key cap.

The switch may comprise a membrane switch and the key cap comprises a switch operation protrusion on a side other than the legend for actuating the switch. Advantageously, the membrane switch provides a space efficient and reliable switch arrangement that may be provided directly on a circuit board.

One of the switch and the key cap may comprise a resilient actuation transmission member configured to limit the force that will be passed to the switch on actuating the key cap. Advantageously, a part needed to actuate the switch may double as a force limiter so as to protect the switch from excessive forces. The resilient actuation transmission member may comprise an electrically conductive surface that is configured to make a contact in the switch when the key cap is actuated.

The switch arrangement may further comprise a light guide for conducting light to a user via the hole.

According to a third aspect of the invention there is provided a mobile communication device comprising a back light illuminator and a key cap providing a visual trace of a character perceivable under back illumination, wherein the key cap defines a plurality of holes to provide spot light outlets adapted to collectively define the trace and the illuminator has been configured to emit light through the holes and spot light outlets.

According to a fourth aspect of the invention there is provided a method of manufacturing a key cap for a mobile communication device, comprising drilling to a key cap a plurality of holes for providing spot light outlets collectively defining a visual trace of a character under back illumination.

A key cap may be provided with back illuminating capability from metals such as steel so that the trace of the character is visible in the dark by the back illuminating and in daylight by the groove. A high quality finish can be provided without need to rely on any plastics holding in place central parts of characters such as "0" and "6" having a loop.

The method may comprise engraving the key cap to make the trace easy to see in the day light. The engraving may comprise routing the surface of the key cap or drilling blind holes having a diameter substantially larger than that of the drilled through holes. The diameter of the blind holes may be 2 to 100 fold the diameter of the drilled through holes.

The method may further comprise blocking the holes with a transparent material to resist the holes being contaminated with particles. The blocking may comprise a sub-step of applying molten translucent resin in or on the holes. The groove and holes may overlap in which case the holes may be blocked by applying the transparent material into the groove.

It should be appreciated that the embodiments of any one aspect may produce corresponding advantages when combined with different other aspects as well and that they can be combined where applicable.

BRIEF DESCRIPTION OF THE DRAWINGS

The invention will now be described, by way of example only, with reference to the accompanying drawings, in which:

FIG. 1 illustrates a mobile communication device 10.

DETAILED DESCRIPTION OF THE INVENTION

The mobile communication device has an array 12 of metal keys 14, each having one or more characters engraved or etched into the surface illustrative of the function or user input associated with actuation of the key. The keys of this particular embodiment are made of steel although other metals could be used.

The keys of the array of the illustrated embodiment abut with their neighbours to produce the appearance of a contoured metal sheet. Because of the abutment of adjacent keys, the key legend of the keys of the array are provided on the keys themselves. Although engraving the pattern enables the character or characters of the legend to be visible to the naked eye in daylight conditions, more difficulty in reading the information may be encountered in less favourable light.

Figure 1:
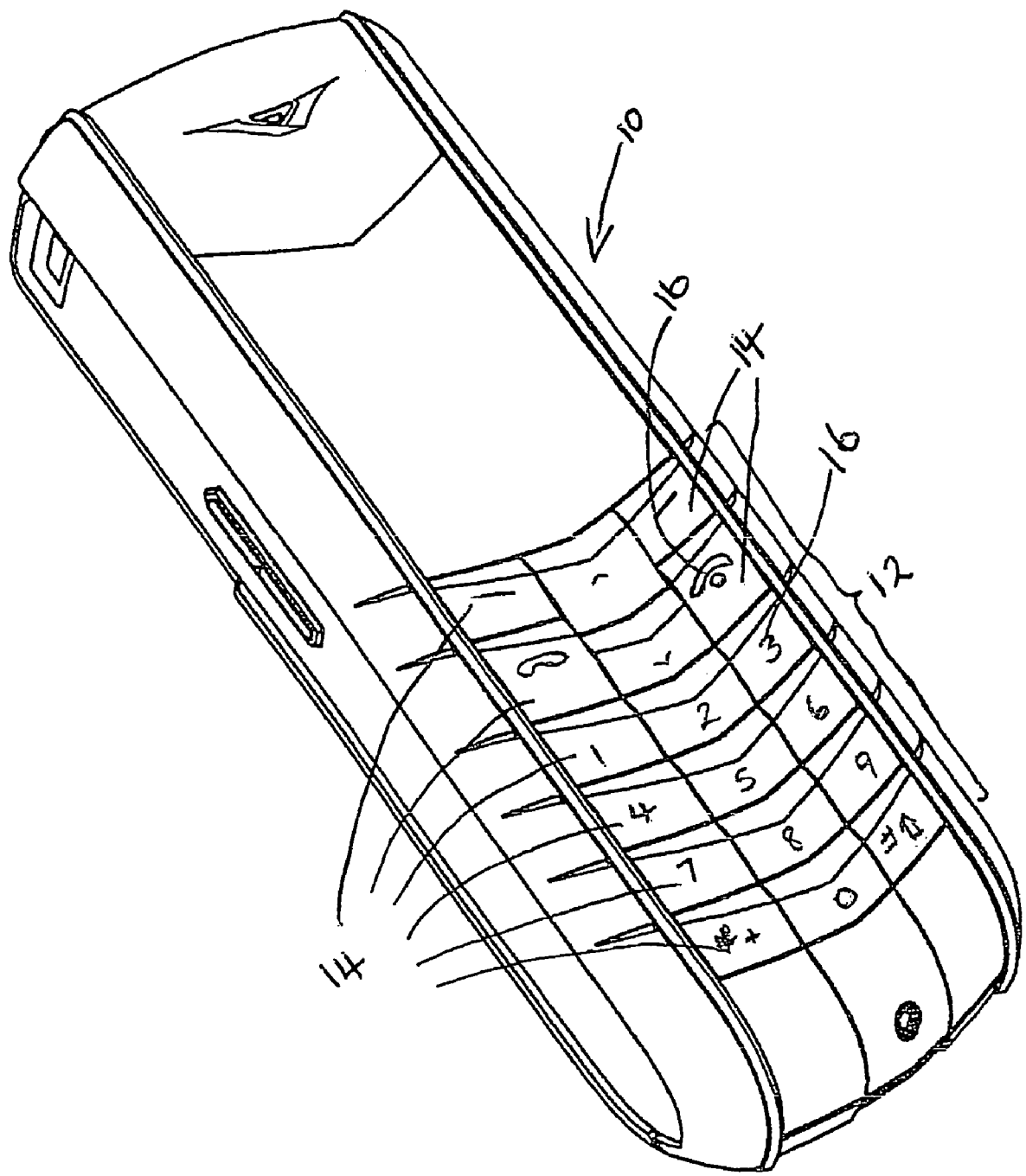
FIG. 1 illustrates an example mobile communication device according to a preferred embodiment.
Figure 2:
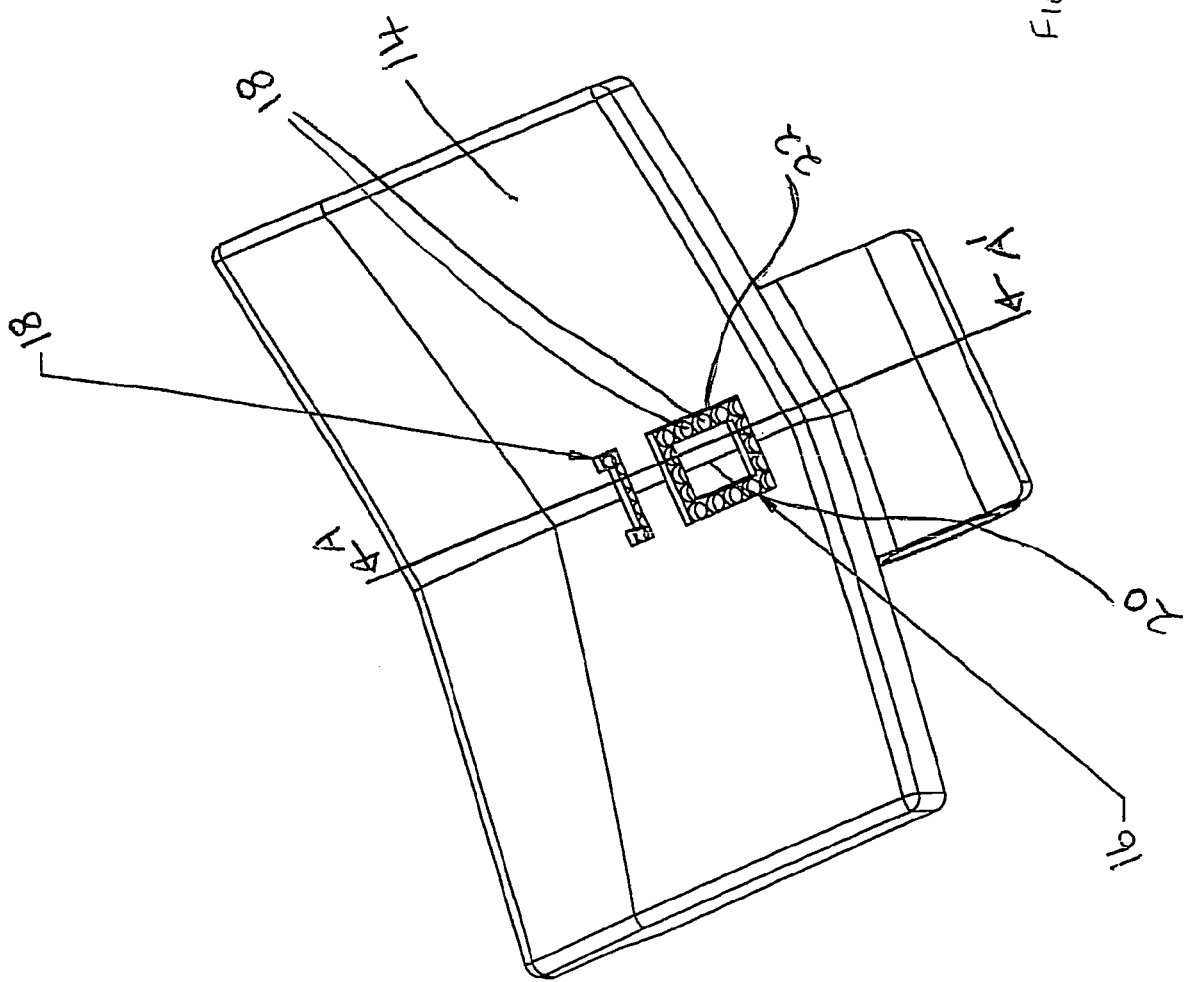
FIG. 2 illustrates a key cap of the mobile communication device of FIG. 1 in more detail.

Illumination of the legend is made possible by a number of holes, cut outs or apertures 18 cut into the key cap directed between the outer and inner surfaces of the key tip. Each hole 18 allows light provided behind the key array to pass through. By providing a string or set of such holes, tracing the engraved character 16, the whole character is illuminated by the back lighting. This can be seen most clearly in FIG. 2. For the present embodiment the holes can range from about 0.02 to 0.3 mm in diameter. The exact size or shape of the holes is not critical, the term hole should be taken to include any cross-sectional shape. The holes should aim to be large enough to let the required amount of light through. In some embodiments it may be desirable for the holes 18 to be close enough together to provide what appears to be a seamless trace of the character when illuminated. For characters having central islands 20, the holes are ideally spaced far enough one from the other to provide bridges 22 of sufficient strength to support the island. The key cap 14 in this embodiment is 0.50 mm thick and the engraving extends to approximately half the thickness, the holes being drilled or punctured through the other half. For such an embodiment, the thickness of bridges 22 may be of the order of 0.10 mm, also subject to the size of the island to be supported such that larger islands 20 require a stronger support which can be provided by increasing the thickness of the bridges 22 and/or the thickness of the key cap 14 and/or by reducing the depth of the engraving.

By using the same size and spacing of the holes along the extent of the trace defining an individual character provides for uniform illumination. This can be replicated for each key in the key array.

Figure 4:
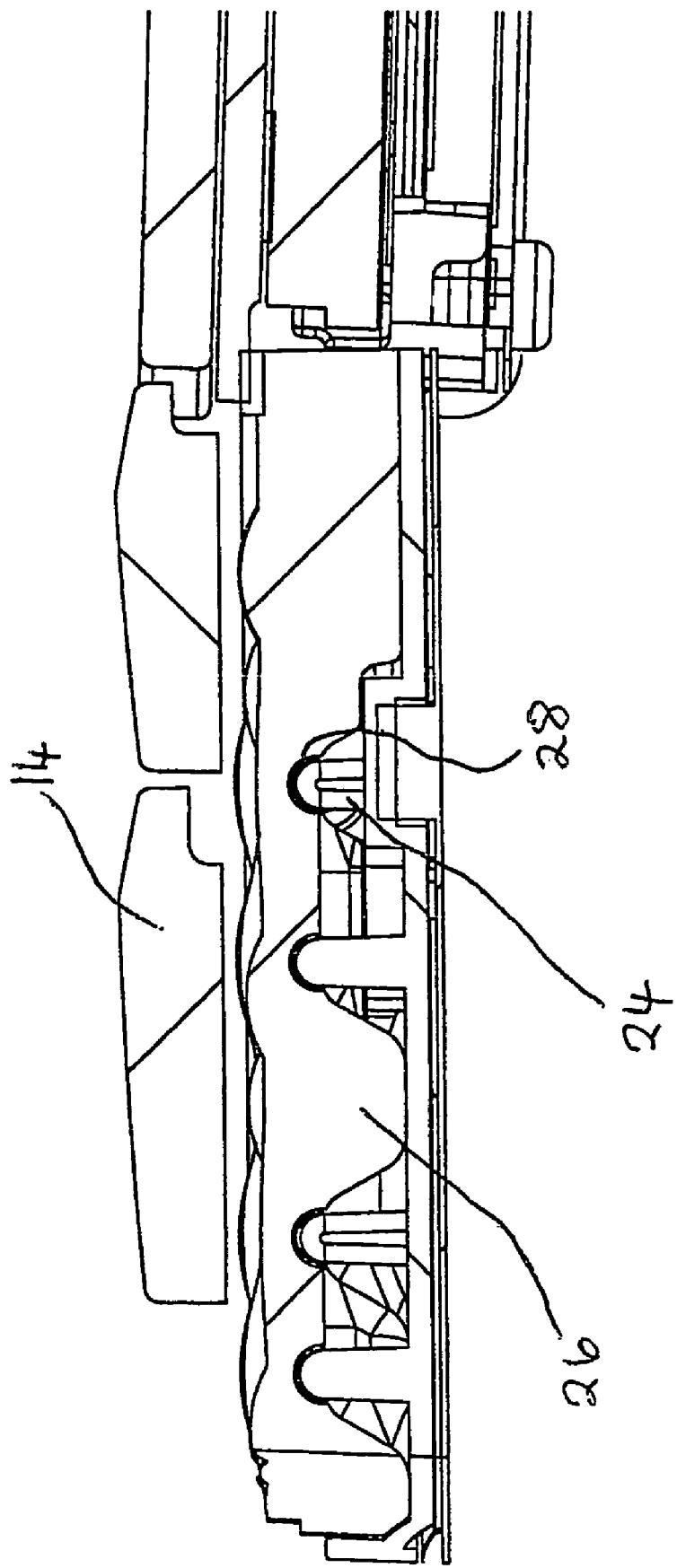
FIG. 4 is a section through the key array of FIG. 1.
Figure 5:
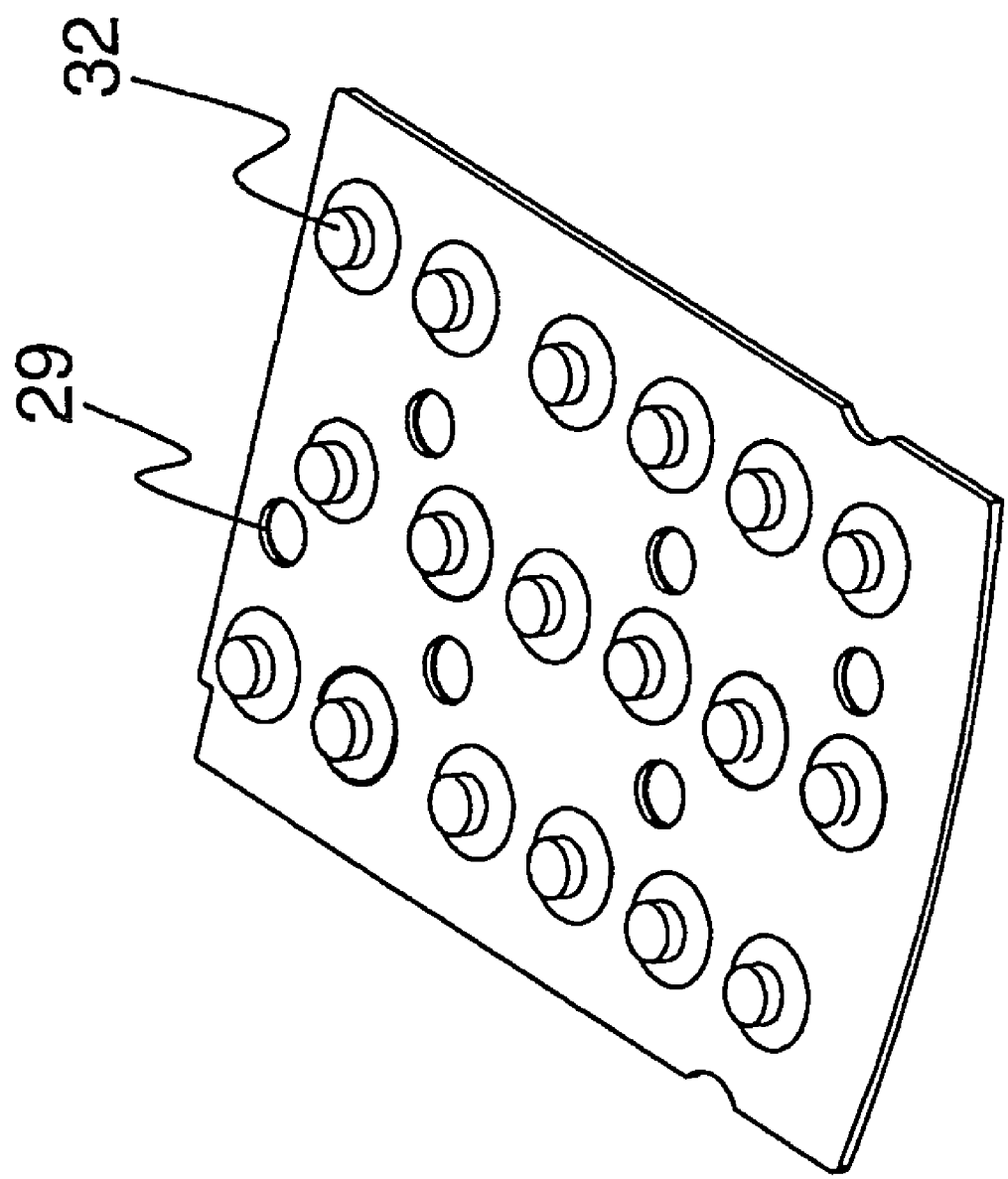
FIG. 5 is a perspective view of a circuit board carrying the switches illustrated in FIG. 4 and showing the location of light sources.
Figure 6:
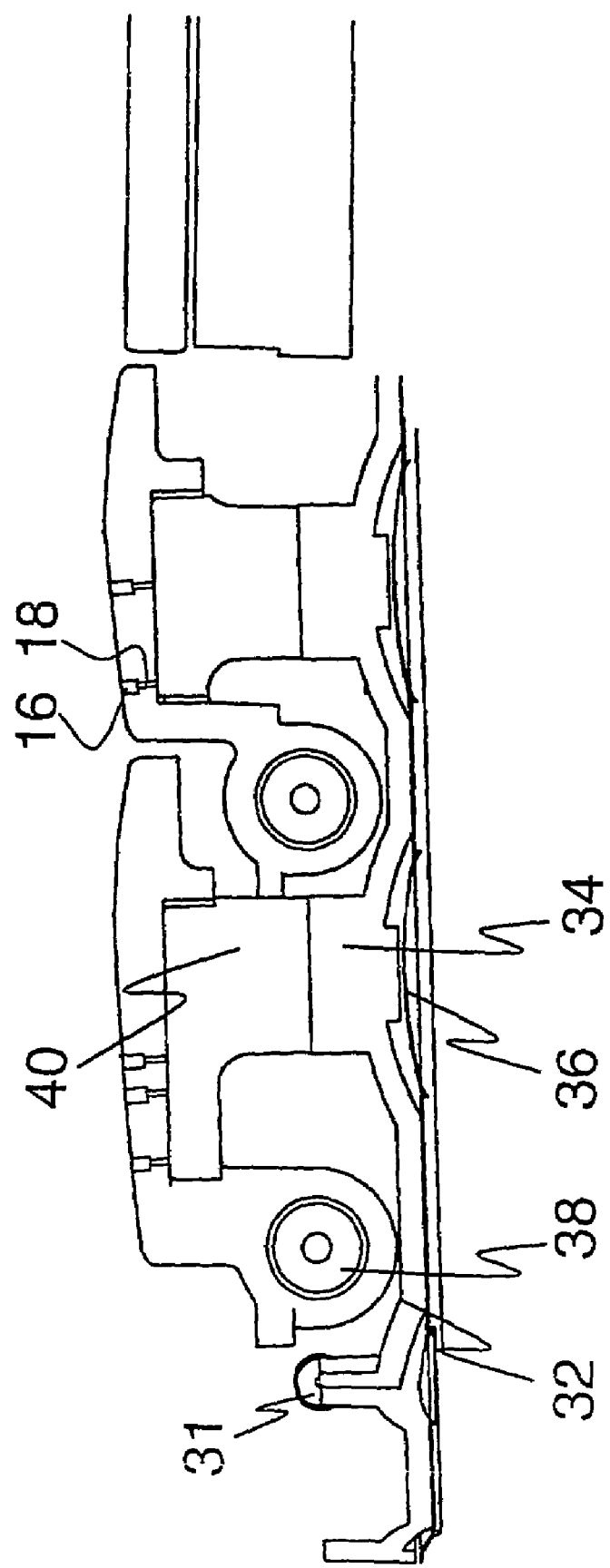
FIG. 6 is illustrates a section of two abutting keys of FIG. 1 showing respectively registered two key caps and switches.

Next turning to FIGS. 4 to 6, the back lighting in the illustrated embodiment is provided by side firing LEDs 24 located between the keys. A diffuse and uniform light is provided by firing these LEDs into a translucent key mat 26 that is located between the keys and switches 36. The key mat has recesses 28 in which the LEDs 24 are located. In order to provide a reasonably uniform diffuse light for all the keys of the array, LEDs are placed in the recesses 28 (FIG. 4) in the key mat at a number of locations 29 (FIG. 5) for the LEDs 24 (FIGS. 4,6) mainly between the keys where they do not interfere with mechanical operation of the keys. The key mat has switch protrusions 34 located respectively in register with each key cap 14 and transparent intervening parts 40 have been attached to the key caps between the key cap and the switch protrusion 34. The depression or actuation of the key results in the intervening part 40 relaying the actuation force to the key mat by its switch protrusion 34 deforming the key mat 32 to depress the switch 36. The transparent intervening parts 40 also guide light from the key mat to the holes 18.

Figure 3:
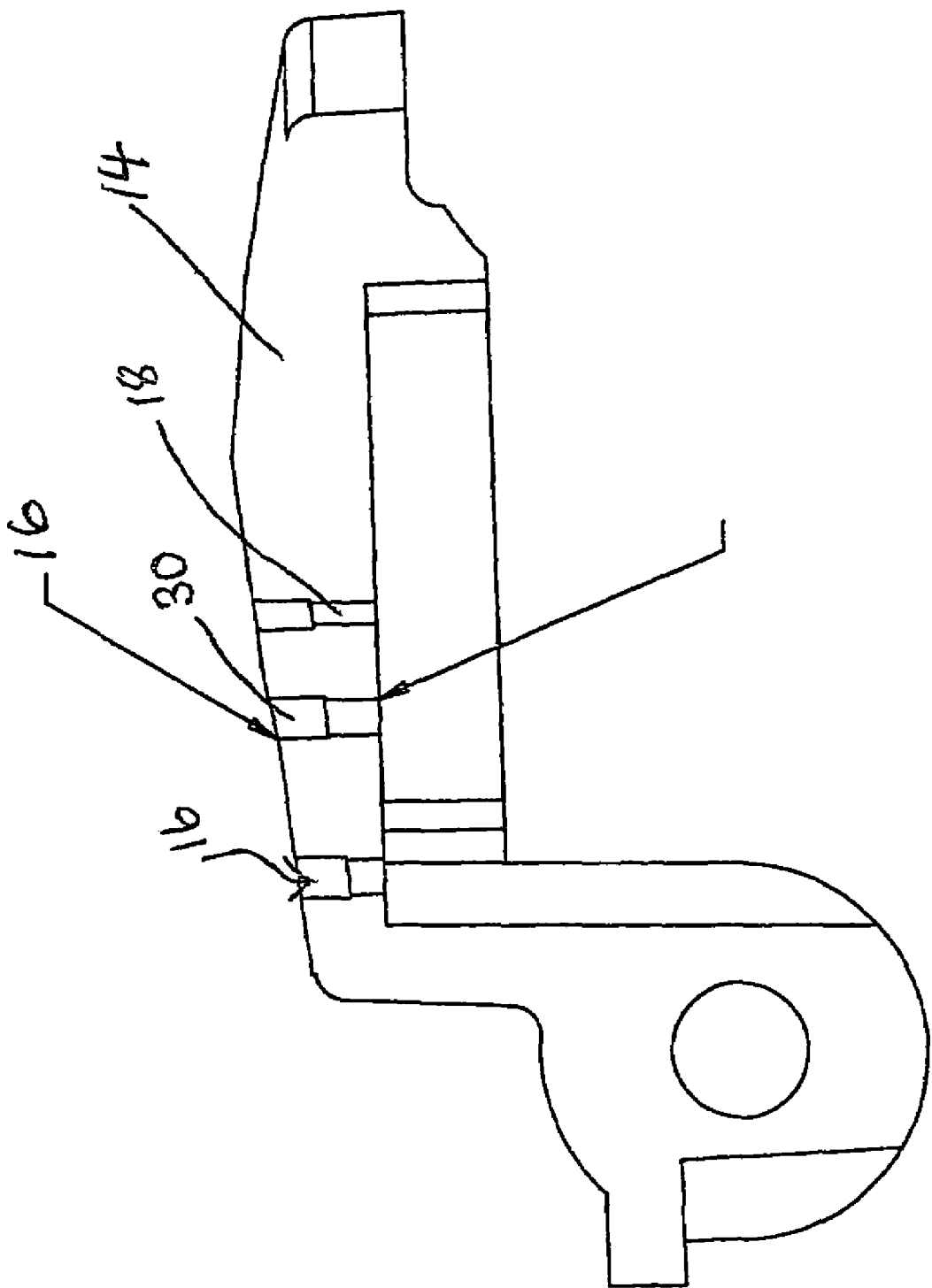
FIG. 3 illustrates a detail of a section of the key of FIG. 2 along the line A-A'.

To prevent the ingress of dirt through the tiny holes the engraved character may be filled with a translucent resin as illustrated in FIG. 3. The translucent resin may provide the additional effect of acting as a diffuser for the light giving an increased angle of visibility. The resin is preferably treated such that it will fill entirely the engraved character without substantially entering to the holes 18. The resin bridging over the mouths of holes 18 will typically define an arched air-to-resin interface which will also cause diffusion to the back light passing through the resin.

Although the illuminable key legends 16 are formed from through drilled holes 18, in this embodiment, blind holes may be used if the material remaining allows sufficient passage of light.

Although embodiments of the invention are particularly useful for metal keys which are not readily illuminated by back lighting, the same technique for illuminating keys could be used for any opaque or semi-opaque material. Further, instead of illuminating traces of characters, the characters may be indicated by arranging corresponding illumination to areas surrounding solid traces of characters such that the characters will appear as non-illuminated regions against illumination surrounding them.

The present invention may be embodied in various forms without departing from its essential attributes. It should be appreciated that the entire detailed description describes a preferred embodiment and can be freely varied by removing, replacing or adding features of this detailed description. That the various features described are optional has not been emphasised for each feature only in sake of clarity and conciseness of the description. Furthermore, each feature disclosed in this specification (which terms includes the claims) and/or shown in the drawings may be incorporated in the invention independently of other disclosed and/or illustrated features. In this regard, the invention includes any novel feature or combination of features disclosed herein either explicitly, implicitly or any generalisation thereof irrespective of whether or not it relates to the claimed invention or mitigates any or all of the problems addressed.

The appended abstract as filed herewith is included in the specification by reference.

The invention claimed is:

1. A key cap, providing a visual trace of a character perceivable under back illumination, wherein the key cap defines a plurality of holes to provide spot light outlets adapted to collectively combine to define a majority of the visual trace of the character, further comprising a groove, at a front face of the key cap and connecting the holes, with the groove further defining the trace of the character such that the trace is visible in daylight.

2. A key cap according to claim 1, wherein the holes have a diameter over 0.02 mm.

3. A key cap according to claim 1, wherein the holes have a diameter under 0.3 mm.

4. A key cap according to claim 1, wherein the holes have an enlarged mouth to facilitate recognition of the character in the daylight.

5. A key cap according to claim 1, wherein the holes are blind holes and the key cap is at least partly transparent in order to pass light through the holes so that the legend can be perceived in the dark.

6. A key cap according to claim 1, wherein the holes have been drilled, punched, etched, or cut.

7. A key cap according to claim 1, wherein the cross-section of the holes is substantially non-directional, particularly substantially circular.

8. A key cap according to claim 1, wherein the holes define the trace by defining a light passing track along the trace or by forming a light passing area around the trace such which itself is less light passing than its surrounding area.

9. A key cap according to claim 1, wherein the holes are substantially unidirectional.

10. A key cap according to claim 1, wherein the key cap defines at least two substantially parallel rows or strings of holes such that they will convey light to different angles substantially consistently.

11. A key cap according to claim 1, wherein the key cap defines a plurality of substantially parallel rows of holes.

12. A key cap according to claim 1, wherein the key cap defines a plurality of holes in a dithered alignment so as to provide an impression of smooth lines particularly at curves.

13. The key cap according to claim 1, further comprising a transparent dust seal to restrain the entry of dust to the interior of the key or a device the key cap is used with.

14. A key cap according to claim 1, wherein the holes have been blocked with a transparent material such that a back light passing through the holes will refract diffusely so as to increase the angle of visibility of such light.

15. A key cap according to claim 14, wherein the transparent material is transparent resin.

16. A key cap according to claim 1, wherein the key cap further comprises a set of protruding points providing writing for the blind.

17. A switch arrangement comprising an electrical switch and a key cap according to claim 1.

18. A switch arrangement according to claim 17, further comprising a light guide for conducting light to a user via the hole.

19. A mobile communication device comprising a key cap comprising a switch arrangement according to claim 17.

20. A key cap according to claim 1, wherein the key cap has been made of an opaque material.

21. A key cap comprising a front end having a first groove and a plurality of holes extending through the key cap from the first groove, wherein bridges located at a bottom surface of the groove are located between the holes, wherein the holes and the groove form a visual trace of a character, wherein the holes provide spot light outlets adapted to collectively combine to define a majority of the visual trace of the character perceivable under back illumination, and wherein the groove and holes combine such that the trace of the character can be viewed in daylight.

* * * * *